I. H. PLEUKHARP.
REAR AXLE TRANSMISSION MECHANISM.
APPLICATION FILED SEPT. 4, 1915.

1,209,330.

Patented Dec. 19, 1916.

UNITED STATES PATENT OFFICE.

IRVIN H. PLEUKHARP, OF COLUMBUS, OHIO.

REAR-AXLE TRANSMISSION MECHANISM.

1,209,330. Specification of Letters Patent. Patented Dec. 19, 1916.

Application filed September 4, 1915. Serial No. 48,964.

*To all whom it may concern:*

Be it known that I, IRVIN H. PLEUKHARP, a citizen of the United States, residing at Columbus, in the county of Franklin and State of Ohio, have invented a new and useful Rear-Axle Transmission Mechanism, of which the following is a specification.

My invention relates to transmission gearing and more particularly to a form of variable speed gearing designed for use on motor vehicles.

The object of the invention is to provide a gearing of this description adapted for mounting on the rear axle of a motor vehicle or on the jack-shaft if the vehicle be chain-driven.

Among the advantages of my invention the following may be enumerated: 1. The highest possible efficiency of transmission, due to the use of direct drives at two different speeds; 2. The use of a semi-direct or single-reduction drive on one additional speed.

The maner in which the foregoing advantages are obtained by my invention will be understood from the following description of a specific embodiment thereof. In this description reference will be had to the accompanying drawings, in which—

Figure 1:
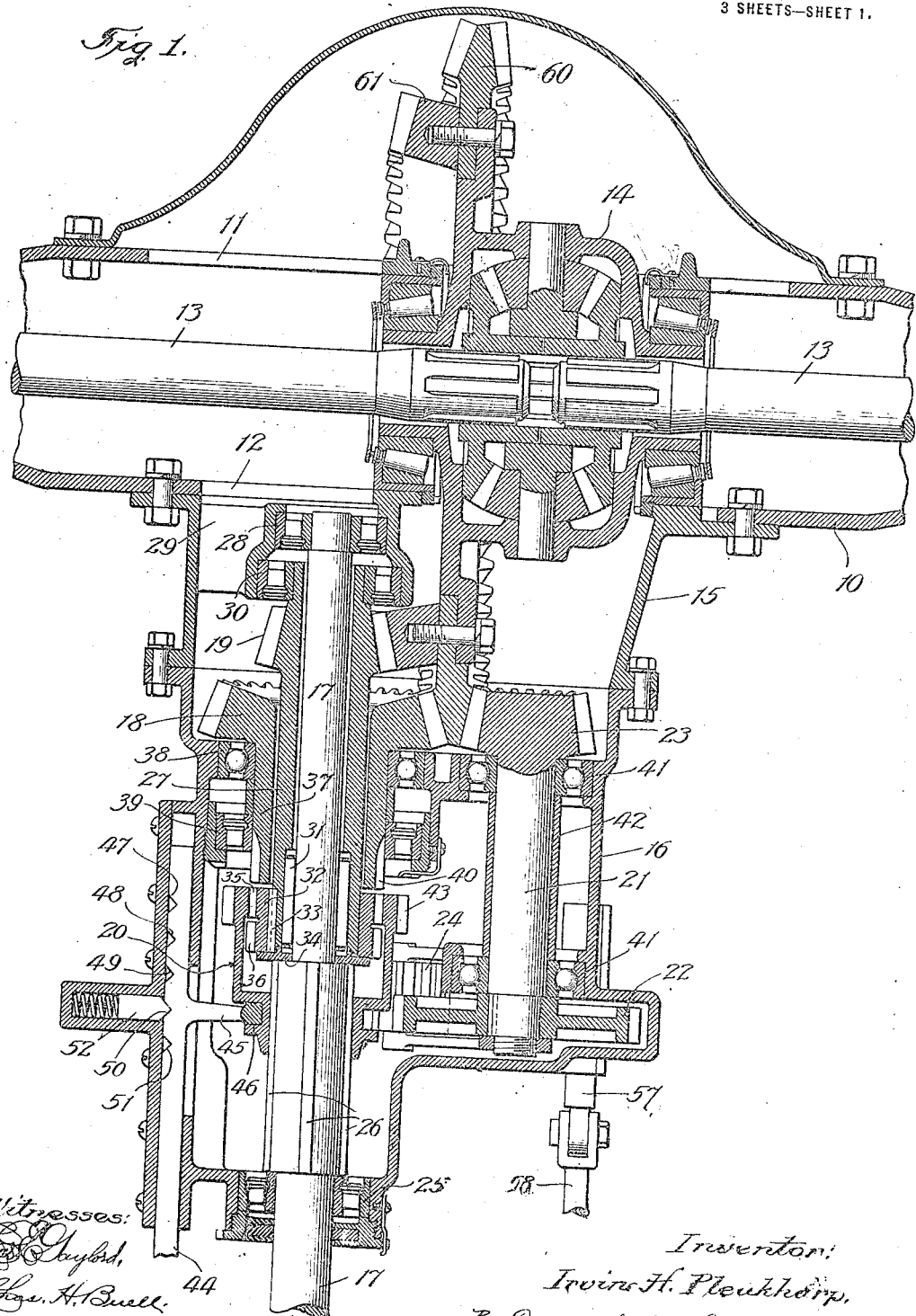
Figure 2:
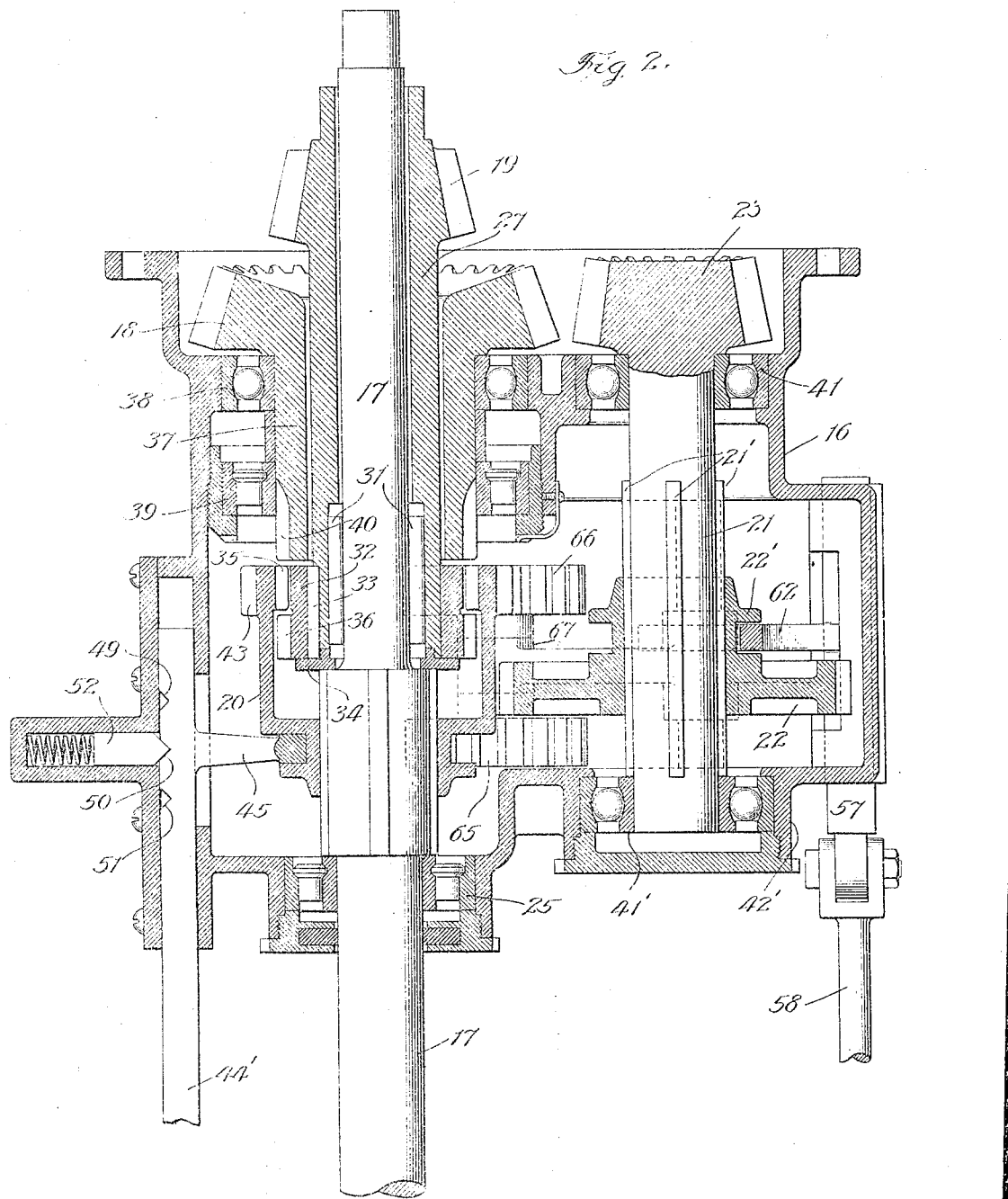
Figure 3:
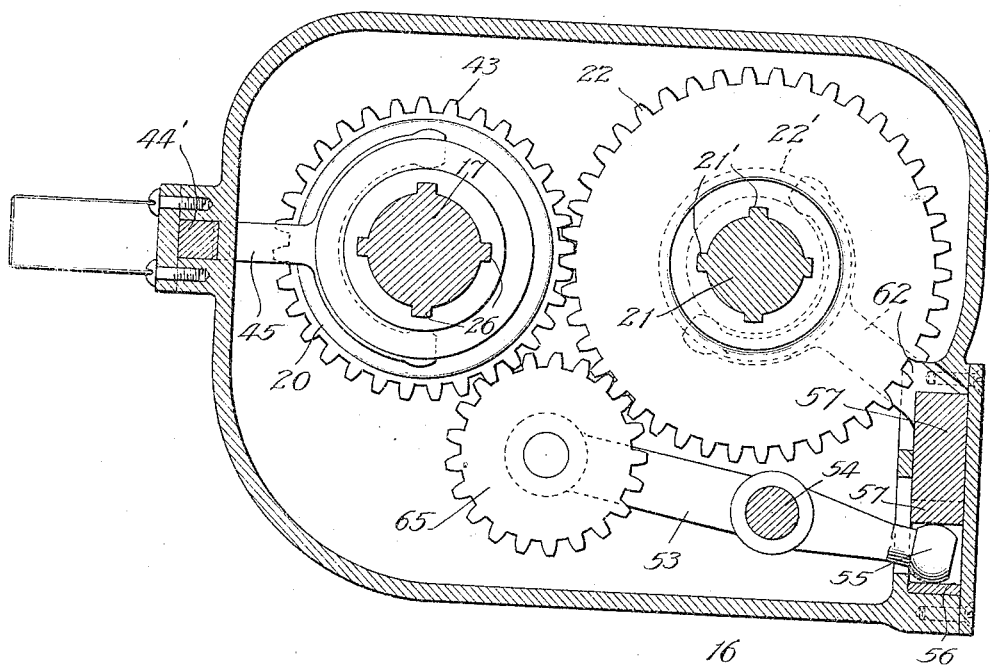
Figure 4:
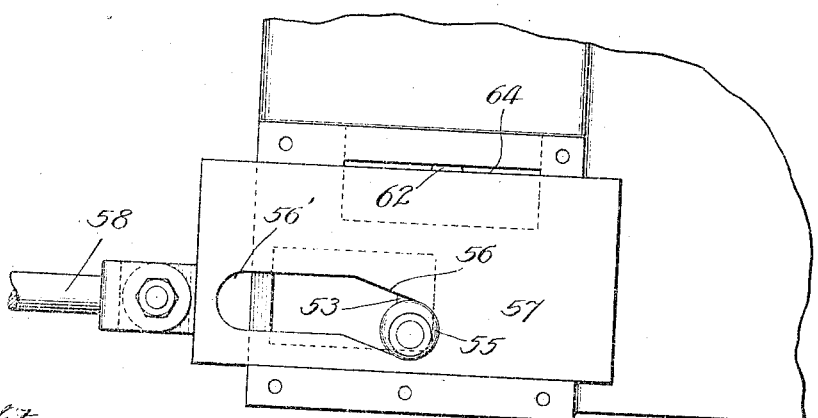

Figure 1 is a horizontal sectional view through the central portion of a rear axle having my improved transmission gearing applied thereto, the gearing shown in this figure being of the "progressive" type; Fig. 2 is an enlarged horizontal sectional view through the gear box, showing the gearing arranged for the "selective" type of control; Fig. 3 is a transverse section through the gear box, showing the reverse pinion; and Fig. 4 is an enlarged elevation of the control block for the reverse and first speed gears.

Referring more particularly to the drawing, the numeral 10 designates a rear axle housing of conventional form and having in its central portion apertures 11 and 12. The rear axle shafts 13 are mounted within the housing member 10 in the usual manner and connected at their inner ends to a standard differential gearing generally designated by 14. This differential gearing is carried in bearings which may be mounted in a gear box section 15, secured in place on the front face of the axle 10 and over the aperture 12 therein. This method of constructing and arranging the parts is well understood in the art and needs no further description.

The front end of the gear box section 15 is open and is provided with a flange by means of which a gear box proper 16 may be secured. Within this latter box the elements which make up my improved gearing are mounted. These elements comprise a driving shaft 17, driving pinions 18 and 19 carried by the driving shaft, a combined clutch and gear 20 also carried by the driving shaft, a counter-shaft or lay-shaft 21 mounted parallel to the driving-shaft, a gear 22 carried by the lay-shaft, and a pinion 23 mounted upon or formed integrally with the lay-shaft. In addition to the seven elements above enumerated my transmission gearing embodies a reverse pinion 24 mounted below and between the lay-shaft and counter-shaft and arranged to be engaged with the gears 43 and 22 thereof.

The preferred construction and arrangement of these parts is illustrated in Fig. 1, from which it will be seen that the drive-shaft 17 enters the front end of the gear-box 16, and is provided with a suitable bearing 25 at this end. Behind the bearing 25 the shaft 17 is preferably enlarged and formed with splines or feathers 26 with which the clutch member 20 has sliding engagement. Beyond the enlarged and splined portion 26 the shaft 17 is further reduced and carried forwardly through the bore of the lengthened hub or sleeve 27 of the pinion 19, and at its inner end is again reduced and mounted in a bearing 28, which may be supported from the gear box section 15 as by a web 29. The sleeve or hub of the pinion member 19 has a bore sufficiently large to clear the shaft 17 and may be extended forwardly of the pinion and mounted in a bearing 30 carried by the same web 29. The outer end of the sleeve 27 may have its bore slightly enlarged to receive an annular bearing 31 which lies between the shaft 17 and the sleeve 27. The bearing 31 may be of any approved anti-friction type but since the relative motions of the pinion 19 and shaft 17 are very small and occur only when there is no load upon the former, a plain bushing will serve satisfactorily as a bearing at this point. The outer end of the extended sleeve or hub 27 has keyed thereon a toothed clutch member 32 as by keys 33, the clutch member being secured in position by a flanged collar 34, the flange of which may be threaded into the counter-bored end of the sleeve 27. The clutch member 32 has its inner end free of clutch teeth and of sufficiently small diameter to clear a set of internal clutch teeth 35 carried by the clutch member 20, the outer end of the clutch member 32 being provided with external teeth 36 adapted for engagement with the internal teeth 35 when the clutch member 20 is moved to effect such engagement. The pinion 18 is also provided with an extended hub portion 37 bored out to a diameter which permits it to clear the hub 27 of the pinion 19, and this hub 37 may be carried by two sets of bearings 38 and 39 mounted in the gear-box housing 16. The outer end of the hub 37 terminates just short of the clutch member 32 and is provided with external clutch teeth 40 similar to the teeth 36 of the clutch member 32 and adapted for engagement with the teeth 35 when the clutch member 20 is properly moved to effect such engagement.

The construction of the parts as so far described is identical in the "progressive" form of transmission illustrated by Fig. 1 and in the "selective" type illustrated by Fig. 2. The difference between these two types resides in the arrangement of the gear 22 upon the lay-shaft 21, and in the operating means for the transmission and the form of the reverse gear 24. In the construction shown in Fig. 1, the lay-shaft 21 has the pinion 23 and gear 22 fixed upon opposite ends thereof, and has its bearings 41 mounted intermediate the gear and pinion, a spacer-sleeve, such as the sleeve 42, being interposed between the bearings for a well understood purpose.

In order to coöperate with the gear 22 the clutch member 20 is provided with external gear teeth 43, which are adapted to mesh with the teeth of the gear 22 when the clutch member is brought to the proper position.

The means for effecting the required movements of the clutch member 20 is shown as a control rod 44, slidable within suitable guides carried by the gear-box 16 and carrying a forked arm 45, the fork of which straddles the hub of the clutch member 20 and rides within a groove 46 therein. The operating rod 44 has formed in one face thereof five notches designated by the numerals 47 to 51 inclusive, and to coöperate with these notches there is provided a spring-pressed plunger 52, the construction being such that the rod 44 may be adjusted longitudinally as by a suitable gear shift lever (not shown) to shift the clutch member 20 to any one of five different positions, the plunger 52 operating to maintain the rod and its connected clutch member in any position in which it may be set.

The reverse pinion 24, as shown in Fig. 1, has a relatively broad face, the width of the face being sufficient to permit it to engage both the gear 22 and the gear teeth 43 of the clutch member 20 at a time when this last named pair of elements are out of engagement with each other, that is, when the plunger 52 is seated in the notch 48 of the rod 44. To permit the gear 24 to be moved into or out of engagement with the gears 22, 43 the form of construction illustrated by Figs. 3 and 4 is adopted. In these figures it will be seen that the gear 24 is carried on an arm 53 which rocks upon a shaft 54 mounted in the lower portion of the gear box 16. In order to rock the arm 53 the latter is extended beyond its pivot and the extended end provided with a ball surface 55, which rides within a cam slot 56 in a control block 57. As shown in Fig. 4, the slot 56 is inclined to the horizontal so that longitudinal movement of the block 57 will lift or depress the ball head 55, whereby the lever 53 is rocked to bring the pinion 24 into or out of engagement with the gears 43, 22. The slide block 57 may be operated as by a push-rod 58 to effect the movement of the arm 53, this push-rod being connected to a separate gear-shift lever or interconnected with the operating means for the rod 44 in any desired manner.

For driving the axle shaft 13 from the drive shaft 17 by means of the transmission gearing above described, I provide a novel arrangement of bevel gears, as illustrated by Fig. 1 of the drawings. This arrangement consists of a double-faced ring gear 60, bolted or otherwise secured to the differential case 14, and a second ring gear 61 of smaller diameter than the gear 60 and mounted concentrically therewith. In the assembled position of the parts, as shown by Fig. 1, the larger ring gear 60 extends between the pinions 18 and 23, meshing simultaneously with each of these driving members. The smaller ring gear 61 engages the pinion 19.

The operation of the transmission mechanism shown in Fig. 1 is as follows: When the rod 44 occupies the position in which it is shown in this drawing, that is, with the plunger 52 engaging the notch 50, the drive-shaft 17 may rotate freely and without transmitting motion to any of the parts of the gearing, saving the clutch and gear member 20, which is splined thereon. This position of the parts may be described as a neutral position. From this neutral position the clutch member 20 may be moved in two directions, i. e., either inward or outward. If it is moved inwardly until the notch 51 comes opposite the plunger 52 the internal clutch teeth 35 of the clutch member 20 will engage with the external clutch teeth 40 cut in the hub 37 of the pinion 18. This may be described as the "high speed" position of the parts. In this position the shaft 17 will drive the pinion 18 and by the engagement of the latter with the double-faced ring gear 60 the rear axle shafts 13 will be rotated at a speed determined only by the relative diameters of the pinion 18 and gear 60. During this driving movement the pinion 19 will, of course, be driven through its engagement with the ring gear 61, but will merely rotate idly upon the shaft 17, being under no load at this time. It will further be noted that this idle rotation will amount only to the difference between the speeds of the shaft 17 of the pinion 19, which is determined by the relative diameters of the pinion 18 and gear 60 on the one hand, and pinion 19 and gear 61 on the other hand. By the engagement of the pinion 23 with the other face of the ring gear 60 the lay-shaft 21 will, of course, also be driven during this high speed driving movement, but it will be seen that this shaft also will turn idly in its bearings and without load.

If the rod 44 be pulled outwardly from the position shown in the drawings and until the plunger 52 engages the notch 49, the clutch member 20 will be moved to engage its internal gear teeth 35 with the external gear teeth 36 of the clutch member 32 which is keyed to the hub of the pinion 19. This may be described as the intermediate or second gear position, and in this position of the parts the drive shaft 17 is directly connected to the pinion 19 and through the latter drives the ring gear 61 to transmit motion to the axle shafts 13. During such intermediate driving engagement the large bevel pinion 18 will idle in its bearings as will also the lay-shaft 21, these parts being driven by the double-faced ring gear 60.

If the rod 44 be pulled outward beyond the position last described, that is, until the plunger 52 engages the notch 48, the clutch member 20 will assume its second neutral position. In this position the internal clutch teeth 35 will have passed outwardly beyond the external clutch teeth 36 of the clutch 32, while the external teeth 43 of the clutch member 20 will occupy a position short of the gear 22 on the lay-shaft 21. From this second neutral position of the clutch member 20, either the first speed gear or the reverse gear may be meshed at a single operation. Thus, if the clutch member 20 be moved from its second neutral position outwardly until the plunger 52 engages the notch 47, the external teeth 43 will be brought into engagement with the gear 22 on the lay-shaft. In this, the first speed position of the parts, the drive will be through the shaft 17 and clutch member 20 to the gear 22, through the lay-shaft 21 and through the bevel pinion 23 to the ring gear 60, thus operating the axle shaft 13 at a speed determined by the gear reduction between the teeth 43 of the clutch member 20 and the gear 22, combined with the reduction between the pinion 23 and ring gear 60. In this position of the parts both the pinion 19 and the pinion 18 will idle in their bearings, being driven by the opposite face of the ring gear 60 and by the ring gear 61, respectively.

Assuming that the control rod 44 has been again moved inwardly to the second neutral position, that is, to the position in which the plunger 52 engages the notches 48, the reverse gear may then be brought into position by operating the rod 58. In such operation the block 57 will be pulled outwardly thus causing the ball end 55 of the arm 53 to move from its upper position in the top of the slot 56 to its lower position in the bottom of this slot. In this movement the arm 53 will be tilted or oscillated to bring the reverse pinion 24 upwardly into engagement with the teeth 43 of the clutch member 20 and the teeth of the gear 22. The pinion 24 then acts as an idler to reverse the direction of rotation in a well-understood manner, and the ring gear 60 will be operated at the same speed but in a direction opposite to that at which it was turning when the first-speed gears were in position.

The construction illustrated in Fig. 2 differs from that shown in Fig. 1 in that the arrangement of the gear 22 on the lay-shaft 21 and the form and disposition of the reverse pinion, has been changed to adapt the transmission mechanism to the selective type of control. The change, in so far as it relates to the gear 22, consists in making this member slidable upon its shaft 21, splines or feathers 21' being used for this purpose, and the gear being provided with a grooved hub 22' adapted to receive a shifter arm 62. The arm 62 may be conveniently carried by the sliding block 57 which operates the reverse arm 53, the guide or casing for the slide block 57 being suitably slotted, as shown at 64 in Fig. 4, to permit the arm 62 to move therethrough. In place of the single reverse pinion 24 shown in Fig. 1, in Fig. 2, a pair of reverse pinions 65, 66, mounted on a common shaft, are made use of. The reverse arm 53, instead of being bifurcated is provided with a single journal 67 (Fig. 2) which carries the central portion of the shaft on which the pinions 65, 66, are mounted. It is necessary that the slide block 57 have a somewhat greater range of movement when it is used for operating the sliding gear 22 than when it operates the reverse pinion alone, as will later appear, and for this reason it is necessary in the construction shown in Fig. 2 to provide the reverse block with an extension slot 56' arranged horizontally and connecting with the inclined or cam slot 56, which operates the reverse arm 53. To provide for the movements of the sliding gear 22 it has also been necessary in Fig.

2 to remove the outer bearing 41. This bearing is shown at 41' in Fig. 2, being there arranged at the outermost end of the shaft 21 and in a hollow boss 42' formed on the gear casing 16. In the construction shown in Fig. 2, the operating rod 44' for the clutch member 20 is somewhat shorter than the rod 44 shown in Fig. 1, and carries only the three notches 49, 50 and 51, the notches 47 and 48 being dispensed with.

The operation of my improved transmission when arranged for the selective type of control, as illustrated in Fig. 2, is as follows: The parts being in the position illustrated by the drawings, the shifter rod 44' may be operated from its neutral position, as shown, in either one of two directions, i. e., inward, until the plunger 52 engages the notch 51, in which position the clutch 20 engages the gear 18, or outward from the position shown, that is, to engage the plunger 52 with the notch 49, in which case the clutch member 20 engages the clutch 32 of the hub of the pinion 19. The operation of the transmission gears driving the axle shafts 13 from the drive shaft 17 is the same in these two positions as was described in connection with Fig. 1. The difference in operation of the two forms of construction lies in the means for bringing the first speed gear and reverse gears into operation. Assuming that the control rod 44' occupies the neutral position shown in Fig. 2, the control rod 58 which is connected to the slide-block 57, may then be operated in either one of two directions, i. e., inward or outward to engage the gear 22, respectively, with the gear teeth 43 of the clutch member 20, or the reverse gear 65. In the inward movement of the block 57 the ball-end 55 of the reverse arm 53 slides in the horizontal slot 56', the reverse gears being thus maintained in their lower or inoperative position while the sliding gear 22 moves into engagement with the gear teeth 43 of the clutch member 20. When the slide or block 57 is pulled outwardly from the position shown in Fig. 2, the sliding gear 22 and the reverse gears 65, 66, move simultaneously, the inclined slot 56 tilting the arm 53 to swing the reverse gears upwardly during the time in which the sliding gear 22 moves outwardly to lie over the gear 65. In the position of the parts first described, i. e., with the sliding gear 22 in mesh with the teeth 43 of the clutch member 20, the drive shaft 17 will operate to rotate the lay-shaft 21 and through the pinion 23 on the latter the ring gear 60 and the attached axle shafts 13 will be driven forwardly at "low" speed. In the last described position of the parts, the gear teeth 43 will drive the reverse pinion 66 and through it the pinion 65, and the latter will drive the gear 22 in the reverse direction.

From the foregoing specification it will be understood that I have provided a form of transmission mechanism in which the high speed and intermediate speed driving engagement is effected through a single gear reduction, i. e., the reduction between the bevel pinions and the ring gears. In the first or low speed driving position of the parts there are two gear reductions, i. e., one reduction from the drive shaft to the lay-shaft and a second reduction from the latter to the axle shaft through the bevel pinion and ring gear 23, 60, respectively. The construction, furthermore, lends itself to a compact arrangement of the parts and the saving of weight as compared with any of the known transmission mechanism of similar efficiency is considerable.

As illustrated by Figs. 1 and 2 of the drawings, my improved transmission gearing may readily be arranged for either the progressive or selective type of operation, as may seem best suited for the particular conditions under which it is employed, the inherent advantages of the transmission mechanism being obtainable as well in one form of control as in the other.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor to any of them, except in so far as I have included such limitations within the terms of the following claims, in which it is my intention to claim all novelty inherent in my invention as broadly as is possible in view of the prior art.

What I claim as new and desire to secure by Letters Patent is:

1. In a transmission gearing and, in combination, a driven shaft, a double-faced gear mounted thereon, a second gear mounted concentrically with said double-faced gear, a driving shaft arranged at right angles to said driven shaft, a pinion sleeved upon said driving shaft and meshing with one face of said double-faced gear, a second pinion sleeved upon the hub of said first named pinion and meshing with said second gear, spaced clutch members carried by the said hub and second pinion respectively, a clutch member connected with said driving shaft and having a clutch element lying between said spaced clutch members whereby the driving shaft clutch element may be moved to selectively drive either of said pinions, a gear carried by said driving shaft clutch element, a lay-shaft mounted parallel to said driving shaft, a gear on said lay-shaft adapted to engage with the gear on said driving shaft, a reverse pinion adapted for engagement with both of said gears when they are out of engagement with one another, and a bevel pinion carried by said lay-shaft and meshing with the other face of the said double-faced gear.

2. In a transmission gearing and, in combination, a driven shaft, a double faced gear mounted thereon, a second gear mounted concentrically with said double-faced gear, a driving shaft arranged at right angles to said driven shaft, a pinion sleeved upon said driving shaft and meshing with one face of said double faced gear, a second pinion sleeved upon said driving shaft and meshing with said second gear, spaced clutch members carried by said pinions, a clutch member connected with said driving shaft and having a clutch element lying between said spaced clutch members, whereby the driving shaft clutch element may be moved to selectively engage either of said pinions, a gear carried by said driving shaft clutch element, a lay-shaft mounted parallel to said driving shaft, a gear slidable on said lay-shaft, and adapted to be moved into engagement with the gear on said clutch, and a bevel pinion carried by said lay-shaft and meshing with the other face of said double-faced gear.

3. In a transmission gearing and, in combination, a driven shaft, a double-faced bevel gear mounted thereon, a second bevel gear mounted concentrically with said double-faced gear, a driving shaft arranged at right-angles to said driven shaft, a pinion sleeved upon said driving shaft and having engagement with one face of said double-faced gear, a second pinion sleeved upon said driving shaft and having engagement with the other of said bevel gears, spaced clutch members carried by said pinions, a clutch member slidable on said driving shaft and having a clutch element lying between said spaced clutch members, whereby said driving shaft clutch element may be moved to selectively engage either of said pinions, a gear formed upon said driving shaft clutch element, a lay-shaft parallel to said driving shaft, a gear splined upon said lay-shaft and adapted to be moved into or out of engagement with the gear formed on said clutch element, a bevel pinion carried by said lay-shaft and adapted to engage the other face of said double-faced gear, and a reverse pinion adapted to transmit motion from said clutch gear to the gear on said lay-shaft when these elements are out of engagement with one another.

4. In a transmission gearing and, in combination, a driven shaft, a double-faced bevel gear carried thereby, a second bevel gear mounted concentrically with said double faced gear, a driving shaft arranged at right-angles to said driven shaft, a bevel pinion sleeved upon said driving shaft and meshing with one face of said double-faced gear, a second bevel pinion sleeved upon said drive shaft and meshing with the other bevel gear, spaced clutch members carried by said pinions, a clutch member carried by said driving shaft having a clutch element lying between said spaced clutch members, whereby said driving shaft clutch member may be moved to selectively engage either of said pinions, a lay-shaft mounted parallel with said driving shaft, a gear splined upon said lay-shaft, a gear carried by said driving shaft and adapted to engage said lay-shaft gear, in one position of the latter, and a reverse gear adapted to be driven from said driving shaft and to engage said lay-shaft gear in a second position of the latter, and a bevel pinion carried by said lay-shaft and adapted to engage the other face of said double-faced gear.

5. In a transmission gearing and, in combination, a driven shaft, a double-faced bevel gear mounted thereon, a second bevel gear mounted concentrically with said double-faced gear, a driving shaft arranged at right-angles to said driven shaft, a bevel pinion sleeved upon said driving shaft and having engagement with one face of said double-faced gear, a second bevel pinion sleeved upon said driving shaft and having engagement with the other bevel gear, spaced clutch members carried by said pinions, a clutch member carried by said driving shaft and having a clutch element lying between said spaced clutch members, a gear carried by said driving shaft clutch, a lay-shaft arranged parallel with said driving shaft, a gear splined upon said lay-shaft, an arm mounted to swing on an axis parallel with said shafts, a reverse pinion carried by said arm and adapted to engage the said clutch gear and said lay-shaft gear, when the latter are out of engagement with each other, a slidable member connected with said lay-shaft gear for shifting the latter, means operable from said sliding member for swinging the said arm, and a pinion carried by said lay-shaft and engaging the other face of said double-faced gear.

In testimony whereof I have hereunto set my hand this 30th day of August, 1915.

IRVIN H. PLEUKHARP.

In presence of—
A. C. FISCHER,
K. O'NEILL.